Sept. 13, 1966     J. W. HENDRY     3,271,820
PELLETIZER WITH STEAM EJECTION OF PELLETS
Filed Aug. 6, 1964
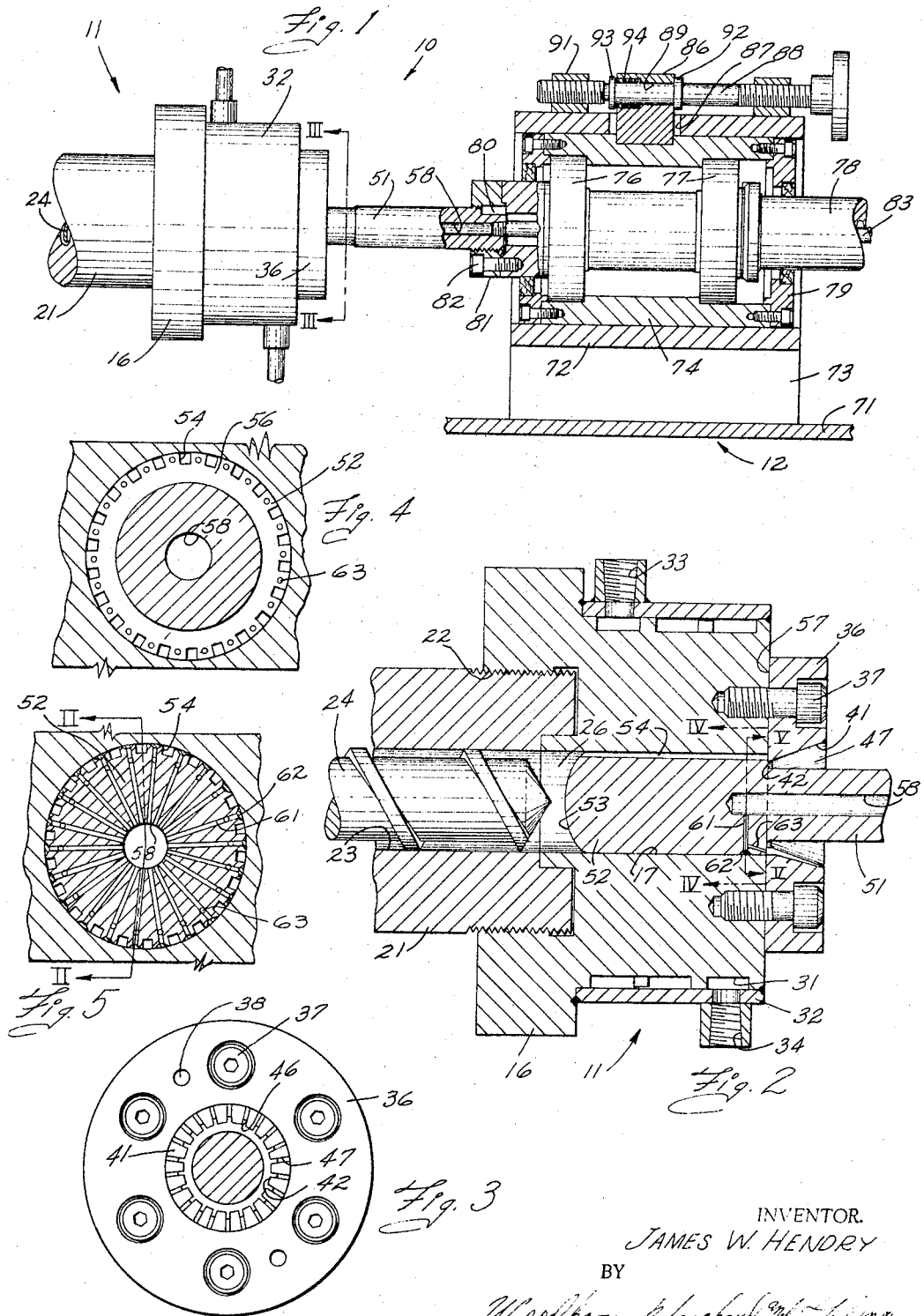
INVENTOR.
JAMES W. HENDRY
BY
Woolhams, Blanchard and Flynn
ATTORNEYS United States Patent Office 3,271,820
Patented Sept. 13, 1966

3,271,820
PELLETIZER WITH STEAM EJECTION OF PELLETS
James W. Hendry, Scottsburg, Ind., assignor to Borg-Warner Corporation, Chicago, Ill., a corporation of Illinois
Filed Aug. 6, 1964, Ser. No. 387,833
9 Claims. (Cl. 18—12)

This invention relates to a device for making pellets of plasticizable material and, more specifically, refers to a device of the type wherein plastic material is forced along a rotatable member and into a fixed die.

The plasticizing portions of plastic injection molding or extrusion machines are generally fed plasticizable material in the form of pellets or granules. These pellets are preferably uniform in size to assure even plasticizing of the material inasmuch as the plasticizing of a mixture of large and small particles of the same material will often result in a material having some unplasticized or incompletely plasticized portions and some material having excessively worked portions, which latter in some materials are often decomposed or otherwise degraded.

One early method for preparing plasticizable pellets comprised cutting of a flat sheet of material into strips and cutting the strips into pellets which resulted in pellets of rectangular form. Pellets of rectangular shape are thus widely used and in some instances are the most familiar and best accepted form of pellet. The afore-mentioned method, however, is a relatively expensive one requiring either a complex and expensive machine or considerable expenditure of manual effort and time. Several machines have been proposed in the prior art which include somewhat more sophisticated and effective methods for producing such pellets. Such machines have generally included a die part, means for forcing the material into or through said die part and further means, such as a revolving knife, for separating the pellets formed by said die part from the remainder of the material. Such machines have often lacked satisfactory means for disengaging the pellets so formed from the apparatus by which they are formed, have been incapable of economical construction for a satisfactory rate of output, have been incapable of closely controlling the configurations of the pellets produced, or have been found inefficient for any of a variety of other reasons.

As a result, the objects of this invention include:
(1) To provide a mechanism for forming pellets of a plasticizable material.
(2) To provide a mechanism, as aforesaid, in which the plastic material to be pelletized is fed past a revolving member to a fixed die and in which the said revolving member is operable independently of means used to feed said material therepast.
(3) To provide a mechanism, as aforesaid, in which said die is of an annular configuration and is disposed coaxially of said rotating member, in which said rotating member and die have axially alignable openings, whereby said material is forced along said openings in said rotating member and into said openings of said die and in which rotation of said rotating member with respect to said die shears the material of said pellet from the remainder of the material in the opening of said rotating member.
(4) To provide a mechanism, as aforesaid, in which the speed of rotation of the rotating member and the rate of axial flow of said material determine the amount of material in each pellet, in which said die determines the cross section of said pellet, in which the thickness of the pellet is preselectable and is readily adjustable as desired, which is capable of producing pellets consistently within close size tolerances and which after an operation relating to one size of pellets is readily reset to produce pellets of a differing size.
(5) To provide a mechanism, as aforesaid, in which the rotating member is adjustable axially of said die to achieve an optimum location with respect thereto, to prevent undue wear thereto and to prevent infiltration of material into the space between the radial faces thereof.
(6) To provide a mechanism, as aforesaid, in which steam under pressure ejects pellets from said die, said steam being emitted from jets in said rotating member placed in axial alignment with said pellets by rotation of said member.
(7) To provide a mechanism, as aforesaid, readily adaptable to temperature control by fluid flow or the like.
(8) To provide a mechanism, as aforesaid, in which said die and said rotating member are readily replaceable by similar but modified pieces having differing parameters to produce pellets of different cross-sectional sizes and shapes and/or in greater or lesser numbers per revolution of the rotating member.
(9) To provide a mechanism, as aforesaid, which is substantially self-cleaning while in operation, in which all of the material therein is fed therethrough as long as the machine is in operation, and which is readily disassembled for cleaning and is readily cleaned when the material being handled must be removed from the apparatus after a given operation is finished.
(10) To provide a mechanism, as aforesaid, which is of simplified construction and which may be constructed at relatively low cost either singly or in mass production.
(11) To provide a mechanism, as aforesaid, which is capable of sturdy construction for a long service life under rugged operating conditions and with little or no maintenance and which is readily maintained and operated by relatively inexperienced personnel.

Other objects and purposes of this invention will be apparent to persons acquainted with apparatus of this general type upon reading the following specification and inspecting the accompanying drawings.

In the drawings:
FIGURE 1 is a partially broken, side elevational view of a mechanism embodying the invention.
FIGURE 2 is an enlarged central cross-sectional view of a portion of the mechanism of FIGURE 1, the central portion thereof being taken on the line II—II of FIGURE 5.
FIGURE 3 is an enlarged sectional view essentially as taken on the line III—III of FIGURE 1.
FIGURE 4 is an enlarged sectional view essentially as taken on the line IV—IV of FIGURE 2.
FIGURE 5 is an enlarged sectional view essentially as taken on the line V—V of FIGURE 2.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and of designated parts thereof. Said terminology will include the words above specifically mentioned, derivatives thereof and words of similar import.

*General description*

In general, the objects and purposes of the invention are met by providing an extrusion chamber having an annular, internally grooved extrusion die at one end thereof and including feeding means capable of feeding plasticized material to the other end of said chamber. A rotatable shaft extends into said chamber through said extrusion die and has a head portion snugly but rotatably contained within said chamber and closely adjacent the inner surface of said extrusion die. The head is externally axially contoured to allow said material to be forced therealong and into the grooves of said extrusion die as said shaft rotates said head. Said head includes also a plurality of pressure fluid, usually steam, outlets interspersed with said grooves adjacent said die for ejecting pellets disposed within said die grooves therefrom as said head rotates therepast.

Detailed description

Turning now to the drawings, FIGURE 1 discloses a mechanism 10 embodying the invention and including a pelletizing portion 11 and a shaft actuating portion 12.

The pelletizing portion 11 includes a generally cylindrical housing 16 (FIGURE 2) having a central opening 17 therethrough. A feed cylinder 21 is affixed to the leftward end of the housing 16 by any convenient means, here by threaded reception within a rightwardly opening recess 22 in the housing 16. The feed cylinder 21 includes a central opening 23 coaxial with the central opening 17 and of diameter preferably identical thereto. The central openings 17 and 23 comprise an extrusion chamber 26. Feed means, here a rotatable extrusion screw 24, is disposed within the central opening 23 for impelling plastic material from any convenient source, not shown, along the central opening 23 and into the central opening 17. Such feed means may be a ram, if desired, rather than a screw. The housing 16 preferably includes a plurality of interconnected grooves 31 in the circumferential surface thereof. Said grooves 31 are surrounded by a cylindrical sleeve 32 affixed to the housing 16 by any convenient means, such as welding, to form a passage for a suitable temperature moderating fluid such as water. Suitable openings 33 and 34 allow communication of the grooves 31 with a suitable source of fluid, not shown.

An annular extrusion die 36 (FIGURES 2 and 3) is affixed to the rightward end of the housing 16 coaxially of the extrusion chamber 26 by screws 37 and locating pins 38. The die 36 has a substantially conical recess 41 divergently opening through the rightward end thereof coaxially of the extrusion chamber 26. A cylindrical opening 42 communicates coaxially between the recess 41 and extrusion chamber 26 and is of somewhat lesser diameter than said extrusion chamber 26. A plurality of identical, preferably rectangular and evenly spaced grooves 46 are axially aligned in the peripheral surface of the cylindrical opening 42 and are of sufficient depth that the radially outer portions thereof are axially aligned with the peripheral wall of the extrusion chamber 26. The grooves 46 each have a generally rightwardly directed extension 47 in the peripheral wall of the recess 41 which decreases in depth toward the rightward end of said recess 42.

A shaft 51 (FIGURES 1 and 2) is rotatably supported and directed by the shaft actuating portion 12, as further hereinafter described. The shaft 51 has a radially enlarged substantially cylindrical head 52 preferably integral therewith and at the leftward end thereof. The head 52 is snugly but rotatably disposed within the central opening 17 of the housing 16. Thus, the portion of the shaft 51 adjacent the head 52 extends through and is radially spaced from the cylindrical opening 42 and recess 41. The head 52 has a preferably convex leftward end surface 53 for directing material forced thereagainst by the screw 24 radially outwardly therefrom. A plurality of evenly spaced, substantially rectangular slots 54 (FIGURES 2, 4 and 5) extend substantially axially along the head 52 and open through the rightward end thereof. The rightward end of the head 52 comprises an annular, substantially radial face 56. The radial face 56 is normally disposed snugly against the inner radial surface 57 of the die 36 adjacent the cylindrical opening 42. As a result, the slots 54 in the head 52 are capable of communicating with the grooves 42 in the die 36 upon rotation of the shaft 51 with respect to said die 36. It is preferred that the slots 54 are rectangularly shaped and of the same circumferential width as the grooves 46. Further, the slots 54 are preferably, although not necessarily, equal in number to the grooves 46 and are of preferably lesser radial depth.

However, either or both of the slots 54 and the grooves 46 should be narrower circumferentially than the lands separating them so that there will always be a bearing surface between the head 52 and the die 36 and no tendency for the parts to interlock.

The shaft 51 includes a centrally located ejection fluid passage 58 which is connected to a source of any convenient ejection fluid under pressure, said fluid being chosen according to the type of plastic being handled and according to the convenience of a given installation but which is in many instances steam and will for convenience be hereinafter usually referred to as steam. Said passage 58 extends leftwardly therethrough to a point within the head 52. A plurality of substantially radially disposed holes 61 extend outwardly from the ejection fluid or steam passage 58 to points between the slots 54. In the particular embodiment shown, the holes 61 were provided by radially drilling the head 52 from the outside thereof and capping the outside end of the resulting drilled holes by any convenient means such as welding, brazing or the like as indicated at 62. Leftwardly and inwardly sloped jet openings 63 communicate from points between each of the slots 54 on the radial face 56 and to respective ones of the holes 61.

The shaft actuating portion 12 (FIGURE 1) includes a fixed base 71 which supports a cylindrical guideway 72 coaxially of the shaft 51 by means of a suitable support element 73. A cylindrical slide 74 is snugly but slideably disposed within the guideway 72 and rotatably supports a hollow drive shaft 78 by means of bearings 76 and 77. The drive shaft 78 connects to any convenient source of rotational motion, not shown, at the rightward end thereof. Suitable seal structures 79 are placed at each end of the slide 74 to maintain the bearings 76 and 77 and drive shaft 78 axially affixed with respect thereto and to prevent leakage of lubricant out therefrom. A coupling 81 is affixed to the leftward end of the drive shaft 78 by screws 82 and threadedly receives the rightward end of the shaft 51 therein. Suitable key means 80 may be employed to prevent unintended relative rotational movement between the coupling 81 and shaft 51. A suitable conduit 83 communicates with the steam passage 58 in the shaft 51 and extends axially through the hollow drive shaft 78 to a suitable source of steam under pressure, not shown. An actuating block 86 is affixed by any convenient means, such as welding, to the outer surface of the slide 74 and extends radially outwardly therefrom through an axially elongated opening 87 in the guideway 72. A rod 88 extends through an opening 89 in the actuating block 86 and is threadedly supported by a spaced pair of nuts 91 affixed to the guideway 72 for axial adjustment with respect to said guideway 72. Suitable locking means such as the abutments 92 and 93 prevent axial movement of the rod 88 with respect to the actuating block 86 whereby axial adjustment of the rod 88 causes, through the actuating block 86, a corresponding axial adjustment of the slide 74 and, hence, shaft 51. A spring 94 may, if desired, be placed between the block 86 and abutment 93 to provide a resilient backing for the force urging the head 52 against the die 36.

Operation

Operation of the mechanism 10 is begun with rotation of the drive shaft 78 by any convenient motor means, not shown, and by energization of the ejection fluid, here steam, passage 58 through the conduit 83 from any convenient source, not shown. The rod 88 may be adjusted as desired to control the clearance and/or axial force between the radial surface 56 of the head 52 and the radial surface 57 of the die 36. Heat exchange fluid may be conducted through the openings 33 and 34 and groove 31 to effect proper temperature control of the pelletizing portion 11. The screw 24 or, if desired, a suitable reciprocating ram in the place thereof, may be energized by any convenient motor means, not shown, to convey plastic material rightwardly through the extrusion chamber 26. The contact end surface 53 of the head 52 causes plastic material impinging thereupon to move radially outwardly thereof toward the slots 54. The slots 54 channel said plastic material during the rightward movement thereof and causes separation thereof into a plurality of elongated strands. The rightward ends of said material strands are forced into the grooves 46 in the die 36 in the brief interval during which the stationary grooves 46 communicate with corresponding ones of the rotating slots 54. The time interval of such communication as well as the pressure to which said elements of material are subjected by the screw 24 affects the amount of material that will be forced into each of the grooves 46 of the die 36. Thus, by varying either the rotational speed of the shaft 51 or the rate of feed of the screw 24, or both thereof, the amount of material deposited in the grooves 46 may be varied. In the particular embodiment of the invention shown, all of the grooves 46 are in simultaneous communication with a separate one of the slots 54 during a given time period, said time period being followed by another time period during which the slot 54 and grooves 46 are substantially out of communication with each other. However, it is fully contemplated that some of the slots 54 may be in communication with corresponding ones of the grooves 46 while others of said slots 54 are only in partial communication or out of communication with ones of the grooves 46 corresponding thereto in order to avoid placing a pulsating load onto the screw 24 (or other pressure means used). This may be readily achieved by providing a differing number of slots 54 and grooves 46 or by otherwise varying the angular spacing of one of the sets of said slots and grooves with respect to the other of the sets thereof.

After a particular slot 54 has moved out of registry with a groove 46, the adjacent steam jet opening 63 will be moved into communication with said groove 46 by rotation of the shaft 51. Hence, ejection fluid, such as steam, under pressure conducted through the ejection fluid passage 58, the communicating one of the holes 61 and said jet opening 63 will impinge upon and force the material pellet in the groove 46 out therefrom whereby the freed pellet of material tumbles out of the die 36 along the surface of the recess 41 and into any convenient reception and storage means, not shown.

It will be apparent that there are no dead corners to collect material within the pelletizing portion 11 and, therefore, that the pelletizing portion 11 will be self-cleaning during operation thereof. After operation has ceased, however, and depending upon the material being pelletized, it may be desired to disassemble the mechanism 11 for cleaning thereof. This is readily accomplished by removal of the screws 37 to release the die 36 from the housing 16. Movement of the portions 11 and 12 away from each other allows withdrawal of the head 52 from the extrusion chamber 26 and removal of the shaft 51 from the coupling 81 allows the die 36 to be removed therefrom.

It will be apparent that pellets of a different shape can be produced merely by modifying the configuration of the die 36. In fact, it is contemplated that the mechanism 10 may be provided with several such dies having grooves 46 of differing configurations. Dies 36 intended for making pellets of differing sizes may be fed by the same head 52 by varying the feed rate of the screw 24 for rotational rate of the shaft 51 whereby to deposit large or small amounts of material in the grooves 46 of the die 36.

Although a particular preferred embodiment of the invention has been disclosed above for illustrative purposes, it will be understood that variations or modifications thereof which lie within the scope of the appended claims are fully contemplated.

What is claimed is:

1. In a mechanism for making pellets of plasticizable material, the combination comprising:
   a chamber and feed means for forcing material through said chamber toward one end thereof;
   die means at said one end of said chamber having an opening therein for receiving material thereinto from said chamber;
   rotatable means independent of said feed means for interrupting the flow of material into said opening; and
   ejection means including means forming a passage and rotatable with said rotatable means to register an end of said passage with said opening for ejecting previously received material from said opening, and means for directing a pressure fluid into said passage and toward said opening.

2. The device of claim 1 wherein there are a plurality of material receiving openings arranged in a circle in said die means, and wherein said means forming said passage has a plurality of interconnected branches formed with each branch having an end successively registrable with said openings.

3. The device of claim 2 wherein said rotatable means includes a plurality of spaced gates circumferentially arranged with respect to each other and in axial alignment with said openings for intermittently interrupting flow of material through said openings and wherein said ejection means includes discharge orifices for pressure fluid arranged in said gates to expel material from said respective openings as said gates successively come into registry with said respective openings.

4. In a mechanism for preparing pellets from plasticized material in a substantially continuous process, the combination comprising:
   a chamber;
   a die having a first opening therethrough communicating with said chamber and having at least one second opening therethrough disposed eccentrically of said first opening and in communication with said chamber for reception of said material thereinto;
   feed means for forcing plasticized material through said chamber toward said die;
   a rotatable shaft driven independently of said feed means extending through said first opening into said chamber including means for preventing egress of said material from said chamber and through said first opening and having at least one radially extending portion adjacent said die for preventing communication between said chamber and each of said second openings for periodically closing said openings to said chamber upon rotation of said shaft;
   means operable upon such closure to eject previously fed material from said second openings whereby the rotation of said shaft will meter the amount of material periodically forced into said second openings and will cause ejection thereof from said second openings.

5. In a mechanism for pelletizing plastic material, the combination comprising:
   a housing having a cylindrical chamber therein;
   feed means communicating with said chamber at one end thereof and capable of forcing plastic material thereinto and therethrough toward the other end thereof;
   an annular extrusion die fixed with respect to said housing at said other end of said chamber and having an opening therethrough coaxial with and communicating with said chamber, said opening having a plurality of axially extending, internal, grooves therein and communicating with said chamber;
   a shaft coaxial with and extending through said opening and means for rotatably supporting said shaft, said shaft having a radially enlarged head rotatably and snugly disposed within said chamber adjacent the inner face of said die, said head having a plurality of slots extending therealong between said feed means and said die, each of said slots in said head being capable of successive registry with said grooves in said die upon rotation of said head;

a fluid passage in said shaft and a plurality of outlets radiating therefrom and opening outwardly of said head between said slots for communication with said grooves in said die alternately of communication therewith by said slots in said head;

whereby material is forced by said feeding means through said slots and into said grooves while said grooves and slots are in registry and the resulting material in said grooves is subsequently expelled therefrom thereafter by fluid pressure from said outlets.

6. The mechanism defined in claim 5 in which the radially outer ends of said internal grooves are located as substantial extensions of said cylindrical chamber.

7. The mechanism defined in claim 5 in which there are means connected to rotate said shaft independently of said feed means.

8. The mechanism defined in claim 5 which further has the added limitations of each of claim 9, claim 6 and claim 7.

9. The mechanism defined in claim 5 including a slide for rotatably supporting said shaft;

a fixed guideway for slideably supporting said slide axially of said shaft; and means for adjusting said slide axially of said guideway for changing the axial pressure between said head and said die.

References Cited by the Examiner
UNITED STATES PATENTS

| | | | |
|---|---|---|---|
| 2,919,467 | 1/1960 | Mercer | 18—12 X |
| 2,958,099 | 11/1960 | Chisholm et al. | 18—12 |
| 2,982,990 | 5/1961 | Zomlefer | 18—12 X |

WILLIAM J. STEPHENSON, *Primary Examiner.*